M. M. MACKERLEY.
Seed-Planter.
No. 34,438.
Patented Feb. 18, 1862.
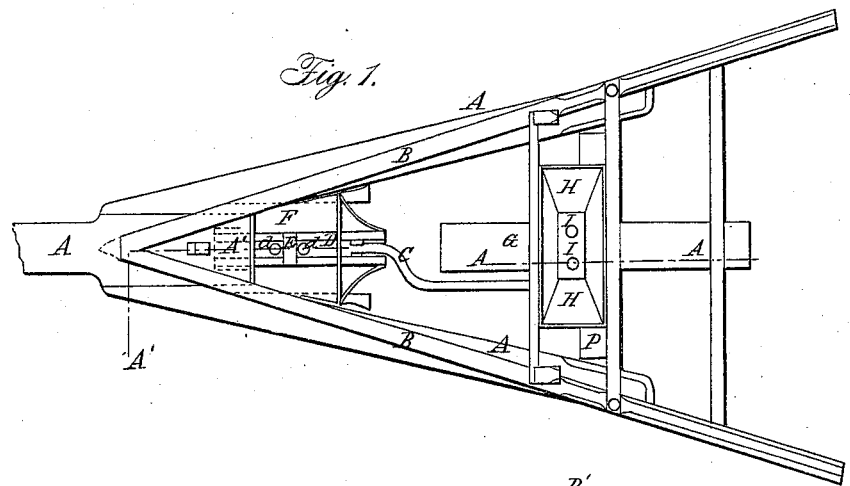
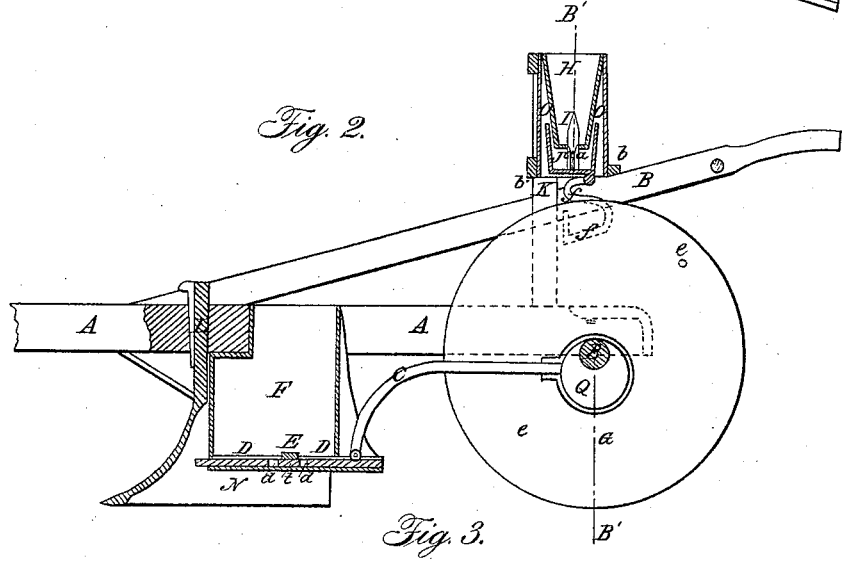
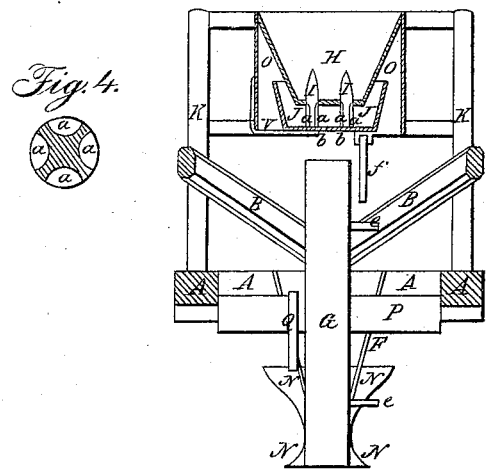
Witnesses:
A. Klink
A. C. Finner
Inventor:
M. M. Mackerly
By his attorney
Amos Broodine

United States Patent Office.

M. M. MACKERLEY, OF SOUTH SALEM, OHIO.

IMPROVED CORN-PLANTER AND LIME-SPREADER COMBINED.

Specification forming part of Letters Patent No. 34,438, dated February 18, 1862.

*To all whom it may concern:*

Be it known that I, MICHAEL M. MACKERLEY, of South Salem, in the county of Ross and State of Ohio, have invented a new and useful machine for the purpose of planting corn and at the same time manuring it; and I do hereby declare that the following is a full, clear, and exact description of the same, reference being had to the annexed drawings, making part of this specification, in which—

Figure 1 is a top view of my said machine; Fig. 2, a vertical section on the line A' A', and Fig. 3 a vertical section on the line B' B'.

My invention consists of a simple, cheap, and efficient machine for the purpose of planting corn and for manuring it on the hill as fast as it is planted.

To enable others skilled in the art to which my invention appertains to make and use the same, I will proceed to describe the construction and operation thereof.

Similar letters of reference represent corresponding parts of the different figures of the aforementioned drawings.

A represents the main frame of the machine; B, the handles; F, the seed-box; D, the dropper, which has a reciprocating motion in the bottom of the said box, imparted to it by means of the eccentric Q on the shaft P and the link c. The dropper has two receivers, d d, made in it, which move alternately over the delivery-hole t, so that two hills of corn are dropped every time the eccentric makes an entire revolution. The piece E, which sits across the bottom of this box and the dropper and directly over the delivery-hole t, prevents any more seed from passing through said hole than is brought to it by the receivers d d.

N is a double mold-board and share, which is made to straddle the lower part of the seed-box, so that the dropper D works between the two mold-boards of the share.

Upon the rear end of the frame A a frame, K, is erected, and to it is secured the manure-box H, the bottom end of which leads into a valve-box, J, in which there are two pin-valves, I I. This box J is held in its position under the box H by means of a spring or springs, v, Fig. 3, secured to the said box and to the frame-box O, which surrounds the whole. The valves I consist of cylindrical pins, the sides of which are grooved from the bottom of the box H to the bottom of the box J. The grooves are shown at a a. Fig. 4 shows a cross-section of the said valves, taken between the boxes.

Now, suppose the box F to be filled with seed and the box H with lime, the wheel G in revolving will bring the pins e e against the dog f, hinged to the bottom of the box J, and raise it, (the springs b yielding,) thus forcing the valve I up and allowing a small quantity of lime to fall in the box J from the box H, and which will be sifted through the holes b on the face of the wheel G, by which it will be carried down on the hill of corn. The relation of the eccentric Q and the pins e on the wheel G is such as to cause the pins to strike the dog f and raise the valves I every time the eccentric causes the dropper D to discharge, by which means a hill of corn is manured every time one is dropped.

Nothing but the fine powdered manure is intended to be used in this machine, such as lime, plaster, and the like.

Besides manuring the hills of corn, this machine furnishes another advantage. It also marks them, by which means the operator is enabled to plant the rows straight in both directions, for the white plaster or lime on the hills furnishes a guide by which he can see whether the succeeding hills are planted in their proper relative positions.

Having thus described the construction and operation of my invention, I claim and desire to secure by Letters Patent—

The box F, the plow N, the valve D, the box H, the eccentric Q, the connecting-rod c, pins e e, valves I, box J, and dog f, the whole to be constructed and arranged with respect to each other substantially in the manner described, for the purpose specified.

MICHAEL M. MACKERLEY.

Attest:
HENRY HESTER,
M. V. GERRARD.